United States Patent
Okuno et al.

(10) Patent No.: US 10,680,487 B2
(45) Date of Patent: Jun. 9, 2020

(54) STATOR UNIT, MOTOR, AND FAN MOTOR

(71) Applicant: Nidec Corporation, Kyoto (JP)

(72) Inventors: Takaya Okuno, Kyoto (JP); Tadayuki Kanatani, Kyoto (JP); Shoki Yamazaki, Kyoto (JP); Yoshihisa Kitamura, Kyoto (JP); Hideki Aoi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 108 days.

(21) Appl. No.: 15/911,430

(22) Filed: Mar. 5, 2018

(65) Prior Publication Data
US 2018/0278118 A1    Sep. 27, 2018

(30) Foreign Application Priority Data

Mar. 24, 2017   (JP) ................................. 2017-059296

(51) Int. Cl.
| | |
|---|---|
| *H02K 7/08* | (2006.01) |
| *H02K 5/173* | (2006.01) |
| *H02K 5/10* | (2006.01) |
| *H02K 5/124* | (2006.01) |
| *F16C 33/72* | (2006.01) |
| *H02K 7/14* | (2006.01) |
| *H02K 5/128* | (2006.01) |

(52) U.S. Cl.
CPC ......... *H02K 5/1735* (2013.01); *F16C 33/723* (2013.01); *H02K 5/10* (2013.01); *H02K 5/124* (2013.01); *H02K 7/14* (2013.01); *H02K 2005/1287* (2013.01)

(58) Field of Classification Search
CPC .......... H02K 5/173; H02K 5/10; H02K 5/124; H02K 7/14; H02K 5/1735; H02K 2005/1287; F16C 33/72; F16C 33/723
USPC ... 310/89, 91, 67 R, 400–415, 418–426, 433
See application file for complete search history.

(56) References Cited

U.S. PATENT DOCUMENTS

| | | | |
|---|---|---|---|
| 5,407,283 | A | 4/1995 | Ohtsuka et al. |
| 6,359,354 | B1 | 3/2002 | Watanabe et al. |
| 8,454,239 | B2 | 6/2013 | Bitou et al. |
| 2004/0136842 | A1 | 7/2004 | Obara et al. |
| 2008/0279493 | A1* | 11/2008 | Masazuki ........... F16C 33/1085 384/100 |

(Continued)

FOREIGN PATENT DOCUMENTS

| | | |
|---|---|---|
| CN | 204517613 U | 7/2015 |
| CN | 105099060 A | 11/2015 |

(Continued)

*Primary Examiner* — Naishadh N Desai
(74) *Attorney, Agent, or Firm* — Keating & Bennett

(57) ABSTRACT

In a fan motor, a stator unit of a motor that rotates an impeller includes a cylindrical bearing holder that extends in an axial direction, a cover that covers an end of the bearing holder on one side in the axial direction, and a seal provided between the bearing holder and the cover. The cover has a disc portion that is provided on the end on the one side in the axial direction and extends in the radial direction, and a cylindrical portion that extends from the disc portion to the other side in the axial direction, and is located inside of the end. The seal has a first seal portion located between an inner side face of the end and an outer side face of the cylindrical portion in the radial direction.

14 Claims, 6 Drawing Sheets

(56) References Cited

U.S. PATENT DOCUMENTS

| | | | |
|---|---|---|---|
| 2013/0004114 A1* | 1/2013 | Hasegawa | F04D 17/16 |
| | | | 384/607 |
| 2013/0259716 A1* | 10/2013 | Teshima | F04D 29/056 |
| | | | 417/321 |
| 2015/0167688 A1 | 6/2015 | Jang et al. | |

FOREIGN PATENT DOCUMENTS

| JP | 7-39263 U | 7/1995 |
|---|---|---|
| JP | 2003-172300 A | 6/2003 |
| JP | 2012-10471 A | 1/2012 |
| JP | 2016-8579 A | 1/2016 |

\* cited by examiner

STATOR UNIT, MOTOR, AND FAN MOTOR

CROSS REFERENCE TO RELATED APPLICATIONS

This application claims the benefit of priority to Japanese Patent Application No. 2017-059296 filed on Mar. 24, 2017. The entire contents of this application are hereby incorporated herein by reference.

BACKGROUND OF THE INVENTION

1. Field of the Invention

The present disclosure relates to a stator unit, a motor, and a fan motor.

2. Description of the Related Art

Heretofore, various efforts have been made for a motor to improve the water-proofing property and the dust-proofing property of a lower end of a bearing holder.

For example, in a fan motor disclosed in Japanese Unexamined Patent Application Publication No. 2015-122942, a second bracket is provided with a lower bearing push-fit portion formed in a lower bearing fit space of the second bearing, and a lower bearing that supports a rotational shaft is fixed to the lower bearing push-fit portion. A lower felt cover is attached to the bottom face of the second bracket. A lower oil ring is provided between the second bracket and the lower felt cover in the axial direction to maintain the hermeticity in the lower bearing fit space.

In an axial fan motor disclosed in Japanese Unexamined Patent Application Publication No. 07-039263, a lower portion of a bearing box that holds a bearing is provided with a hole, and an end cap is attached into the hole to form a sealed structure for covering an end of a shaft.

However, nowadays, there have been needs to further improve the water-proofing property and the dust-proofing property.

SUMMARY OF THE INVENTION

An exemplary stator unit of the present disclosure includes a bearing holder, a cover, and a seal. The bearing holder is cylindrical, and extends in an axial direction. The cover covers an end of the bearing holder on one side in the axial direction. The seal is provided between the bearing holder and the cover. The cover includes a disc portion and a cylindrical portion.

The disc portion is provided on the end on the one side in the axial direction, and extends in a radial direction. The cylindrical portion extends from the disc portion to the other side in the axial direction, and is located inside of the end. The seal has a first seal portion located between an inner side face of the end and an outer side face of the cylindrical portion in the radial direction.

An exemplary motor of the present disclosure includes a shaft that extends in an axial direction, a bearing, a rotor, and the above-mentioned stator unit. The bearing supports the shaft such that the shaft is rotatable about a central axis. The rotor is rotatable along with the shaft. The stator unit includes a stator that drives the rotor. The bearing is disposed in the stator unit, and rotatably supports the rotor. The rotor has a magnet located outside of the stator in the radial direction.

An exemplary fan motor of the present disclosure includes an impeller having a plurality of blades rotatable about a central axis, and above-mentioned motor that rotates the impeller.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Exemplary embodiments of the present disclosure will be described below with reference to figures.

In this specification, a direction parallel to a central axis CA in a fan motor 100 is referred to as "axial direction". Further, one side in an axial direction from a rotor 1 toward a stator unit 2 is referred to as "lower side". The other side in an axial direction from the stator unit 2 toward the rotor 1 is referred to as "upper side". In faces of each constituent, the face oriented upward in the axial direction is referred to as "upper face", and the face oriented downward in the axial direction is referred to as "lower face".

A direction orthogonal to the central axis CA is referred to as "radial direction", and a direction encircling the central axis CA is referred to as "circumferential direction". In the radial direction, a side close to the central axis CA is referred to as "inner side or inside", and a side away from the central axis CA is referred to as "outer side or outside". Further, in side faces of each constituent, the side face oriented inward in the radial direction is referred to as "inner side face", and the side face oriented outward in the radial direction is referred to as "outer side face".

The above-mentioned directions and faces do not indicate positional relations and directions in the case where the constituents are actually incorporated into equipment.

Figure 1:
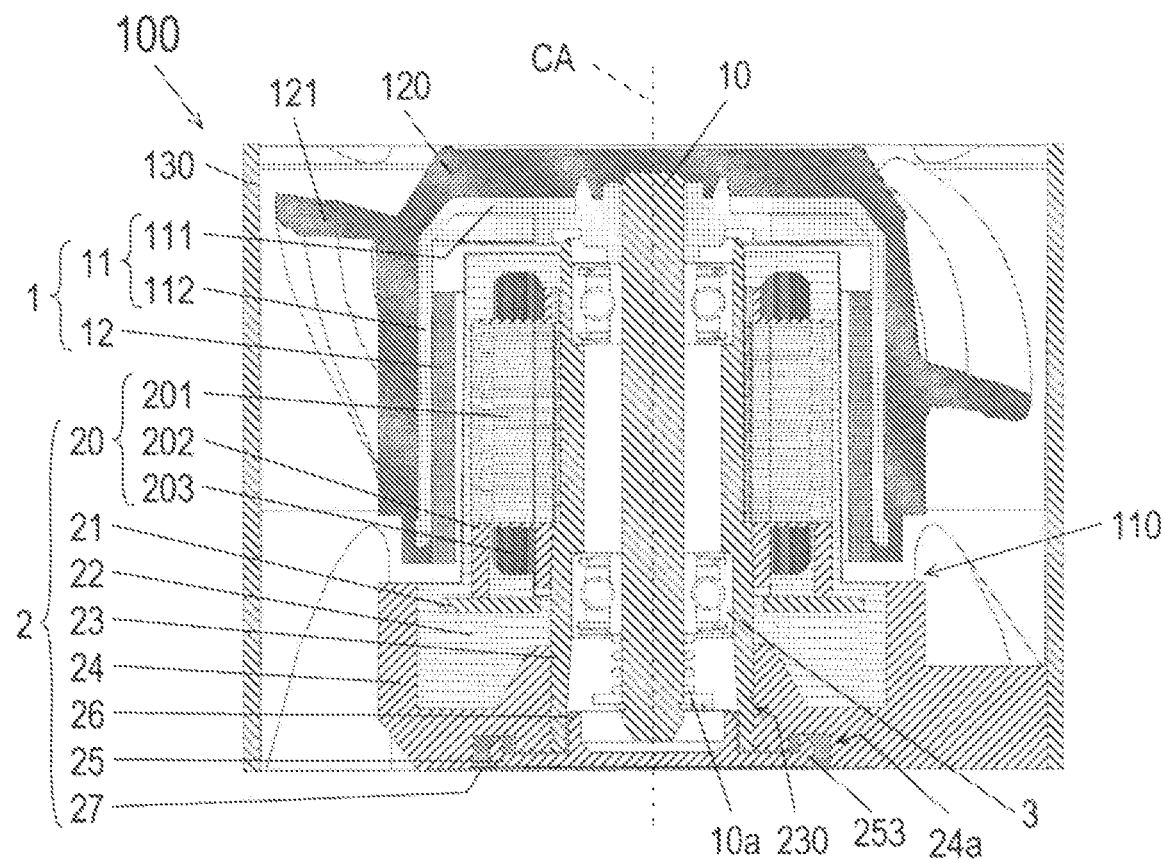
FIG. 1 is a sectional view illustrating an example of the configuration of a fan motor in accordance with an embodiment.

FIG. 1 is a sectional view illustrating an example of the configuration of the fan motor 100 in accordance with an embodiment. In FIG. 1, the outer rotor-type fan motor 100 is cut along a cur face including the central axis CA.

As illustrated in FIG. 1, the fan motor 100 includes a motor 110, an impeller 120, and a casing 130. The motor 110 is a drive device that rotates the impeller 120. The impeller 120 is a vane wheel attached to the upper portion of the motor 110 in the axial direction, and has a plurality of blades 121 capable of rotating about the central axis CA. The impeller 120 can be rotated about the central axis CA by the motor 110, generating an air current flowing in the axial direction. The casing 130 accommodates the motor 110 and the impeller 120, and holds the motor 110.

The configuration of the motor 110 will be described below. As illustrated in FIG. 1, the motor 110 includes a shaft 10 extending in the axial direction, the rotor 1, the stator unit 2, and a bearing 3. The rotor 1 can rotate along with the shaft 10. The stator unit 2 has a stator 20 that drives the rotor 1. The bearing 3 supports the shaft 10 such that the shaft 10 can rotate about the central axis CA.

The shaft 10 is a rotational shaft attached to the rotor 1, and can rotate along with the rotor 1. The shaft 10 is not limited to such rotational shaft, and may be a fixed shaft attached to the stator unit 2. When the shaft 10 is the fixed shaft, the rotor 1 is provided with a bearing (not illustrated) that rotatably supports the shaft 10.

The rotor 1 has a rotor holding member 11 and a magnet 12. The rotor holding member 11 is a member that holds the magnet 12. The rotor holding member 11 has a disc portion 111 and a cylindrical portion 112. The disc portion 111 is a ring-shaped member that extends from the central axis CA outward in the radial direction. The cylindrical portion 112 is a cylindrical member that extends from the periphery of the disc portion 111 downward in the axial direction. The magnet 12 is located outside of the stator 20 of the stator unit 2 in the radial direction. The magnet 12 is held on the inner side face of the cylindrical portion 112, and is opposed to the outer side face of the stator 20.

The stator unit 2 has the stator 20, a base plate 21, a resin portion 22, a bearing holder 23, a housing 24, a cover 25, a seal 26, and a film 27.

The stator 20 has a stator core 201, an insulator 202, and a plurality of coils 203. The stator core 201 is an iron core member including a stacked steel plate formed by stacking electromagnetic steel plates in the axial direction. The insulator 202 is an insulating member made of, for example, a resin material, and covers at least a part of the stator core 201. Conducting wires of the plurality of coils 203 are wound around the stator core 201 via the insulator 202.

The base plate 21 is electrically connected to the conducting wires of the plurality of coils 203. The base plate 21 is also electrically connected to a lead wire drawn to the outside (not illustrated).

The resin portion 22 covers the stator 20, the base plate 21, and the outer side face of the bearing holder 23, and fills the housing 24.

The bearing holder 23 is a cylindrical member that extends in the axial direction, and holds the stator 20 and the bearing 3. The bearing 3 is disposed in the bearing holder 23, and the shaft 10 is inserted into the bearing holder 23. The stator 20 is fixed to the bearing holder 23 on the outer side in the radial direction. The specific configuration of the bearing holder 23 will be described later.

The housing 24 holds the outer side face of the bearing holder 23 on the lower side in the axial direction. The housing 24 is fixed to the casing 130. The motor 110 is held in the casing 130 via the housing 24. A groove portion 24a is provided on an end face (that is, a lower face) of the housing 24 on the lower side in the axial direction. The groove portion 24a extends in the circumferential direction, and is dented upward in the axial direction. More specifically, the groove portion 24a is shaped like a ring around the central axis CA when viewed from the lower side in the axial direction. The groove portion 24a accommodates at least a part of a below-mentioned wall portion 253 of the cover 25.

The cover 25 is fitted into an end 230 of the bearing holder 23 on the lower side in the axial direction. The cover 25 covers the end 230 of the bearing holder 23 and at least a part of the lower end of the housing 24 in the axial direction. The specific configuration of the cover 25 will be described later.

The seal 26 is provided in a space from the bearing holder 23 and the housing 24 to the cover 25, and fills a gap between them. The material for the seal 26 is not particularly limited, and may be a flowable material such as grease or an elastic material such as rubber. Alternatively, the seal 26 may be an epoxy-based or silicon-based adhesive, or may be a thermosetting resin or an ultraviolet curing agent. The specific configuration of the seal 26 will be described later.

The film 27 is applied to the lower faces of the housing 24 and the cover 25. The film 27 covers the groove portion 24a and at least a part of the cover 25 when viewed in the axial direction.

The bearing 3 is disposed in the stator unit 2, and rotatably supports the rotor 1. More specifically, the bearing 3 is held by the bearing holder 23 of the stator unit 2, and rotatably supports the shaft 10 extending in the axial direction. In this embodiment, for example, a ball bearing is used as the bearing 3. The bearing 3 is not limited to the ball bearing, and may be a sleeve spring, for example.

The motor 110 further includes a pre-load spring 10a. The pre-load spring 10a is an elastic member that is provided on the shaft 10 on the lower side in the axial direction, and biases the shaft 10 downward in the axial direction. By providing the pre-load spring 10a to the shaft 10 on the lower side in the axial direction, a longer distance is provided between the cover 25 and the bearing 3 that rotatably supports the shaft 10. Since the pre-load spring 10a is provided on the shaft 10, the pre-load spring 10a is away from the seal 26. This makes it possible to inhibit or prevent a trouble that the seal 26 (for example, a below-mentioned first seal portion 261) hits against or is adhered to the bearing 3 and the pre-load spring 10a.

Figure 2:
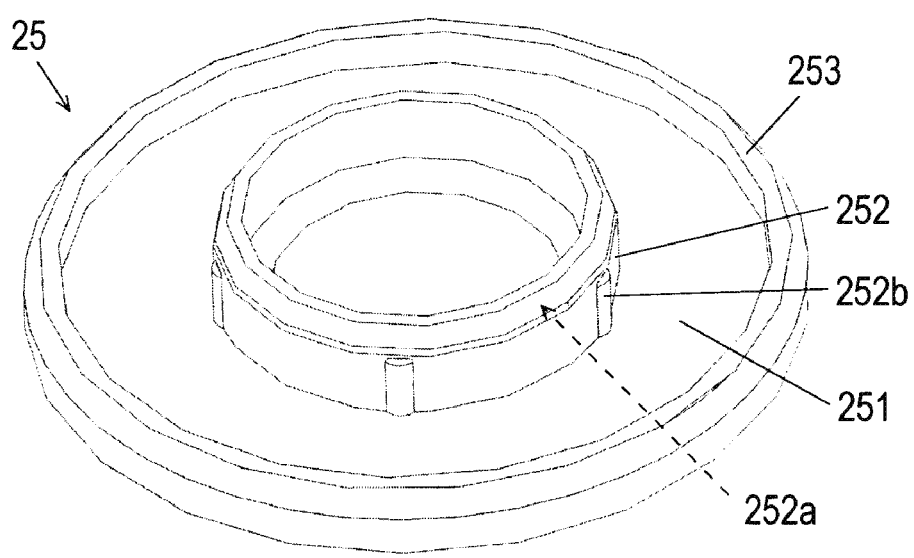
FIG. 2A is a perspective view illustrating a cover.
FIG. 2B is a top view illustrating the cover when viewed in the axial direction.
FIG. 2C is a sectional view illustrating the cover when viewed in a radial direction.
Figure 2:
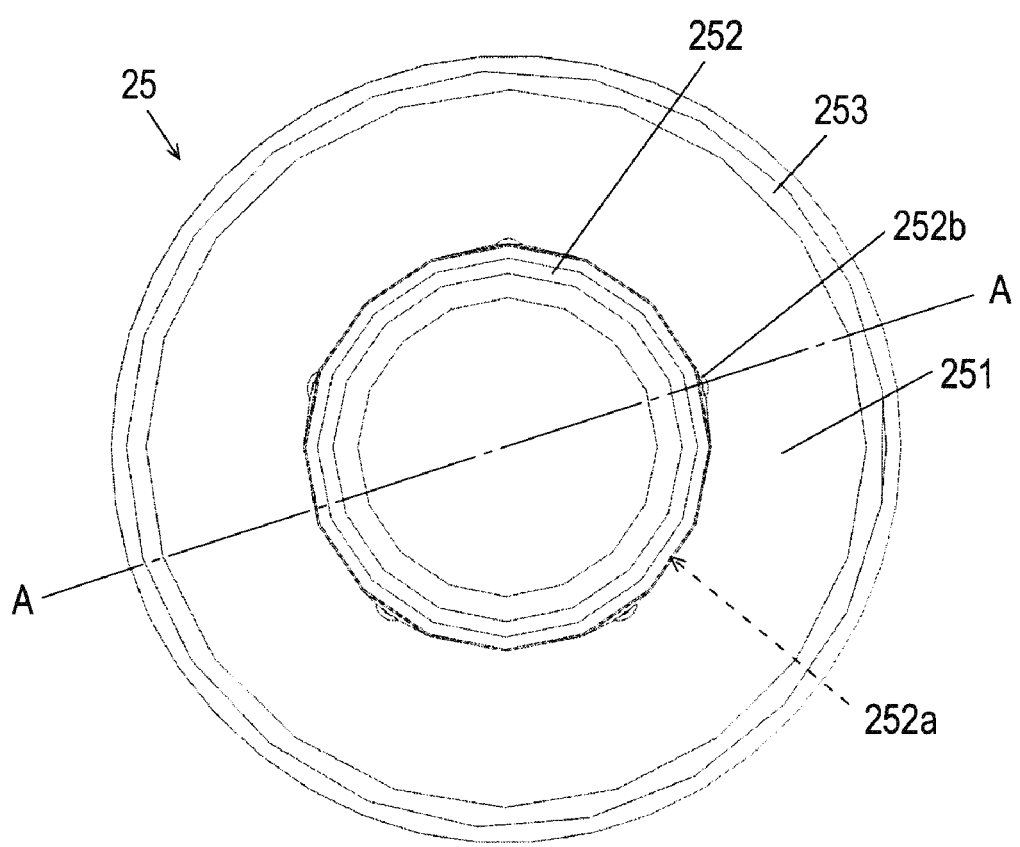
Figure 2C:
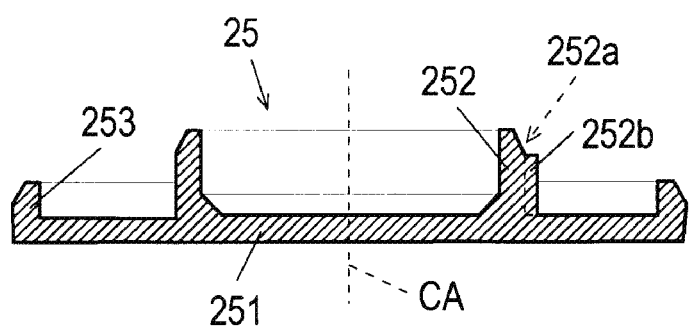

The configuration of the cover 25 will be described below. FIG. 2A is a perspective view illustrating the cover 25. FIG. 2B is a top view illustrating the cover 25 when viewed in the axial direction. FIG. 2C is a sectional view illustrating the cover 25 when viewed in the radial direction. FIG. 2C illustrates a cross section of the cover 25 along a dot-and-dashed line A-A in FIG. 2B.

The cover 25 includes a disc portion 251, a cylindrical portion 252, and the wall portion 253.

The disc portion 251 is shaped like a disc extending in the radial direction, and is located below the end 230 of the bearing holder 23.

The cylindrical portion 252 extends from the disc portion 251 upward in the axial direction, and is located inside of the end 230 of the bearing holder 23. The wall portion 253 is located outside of the cylindrical portion 252 in the radial direction, and extends from the disc portion 251 upward in the axial direction. The cylindrical portion 252 has a first inclined face 252a and protruding portions 252b.

The first inclined face 252a is a face formed in such a way that a radial outer end portion of a tip end on the upper side in the axial direction is chamfered inward in the radial direction. The first inclined face 252a is provided on the end of the cylindrical portion 252 on the upper side in the axial direction and on the outer side of the end in the radial direction, and is annually formed in the circumferential direction about the central axis CA. Thus, the cylindrical portion 252 of the cover 25 can be easily inserted into the end 230 of the bearing holder 23 via the seal 26 (for example, a first seal portion 261). Further, the first seal portion 261 is also provided on the chamfered portion between the end 230 of the bearing holder 23 and the cylindrical portion 252. This makes the first seal portion 261 less likely to run over from between the end 230 of the bearing holder 23 and the cylindrical portion 252 upward in the axial direction. Therefore, it is possible to inhibit or prevent a trouble that the first seal portion 261 hits against or is adhered to the shaft 10, the bearing 3, and so forth.

The protruding portions 252*b* protruding in the radial direction are provided on the outer side face of the cylindrical portion 252. A length of the protruding portions 252*b* in the axial direction is longer than a length of the protruding portions 252*b* in the radial direction. More specifically, the protruding portions 252*b* extend from a lower end of the first inclined face in the axial direction, and reach the upper face of the disc portion 251. In the radial direction, at least a part of the each protruding portion 252*b* abuts the inner side face of the bearing holder 23. More specifically, by fitting the cylindrical portion 252 into the end 230 of the bearing holder 23, upper ends of the protruding portions 252*b* in the axial direction are brought into contact with the inner side face of the end 230 of the bearing holder 23. The present disclosure is not limited to this, and an axially lower part of the inner side face of the end 230 of the bearing holder 23 may contact the protruding portion 252*b*. Further, the first seal portion 261 may be interposed between at least a part of each protruding portion 252*b* and the inner side face of the end 230 of the bearing holder 23. Thus, the protruding portions 252*b* push the first seal portion 261 between the bearing holder 23 and the cylindrical portion 252 in the radial direction, which makes it easier to hold the first seal portion 261 between the end 230 of the bearing holder 23 and the cylindrical portion 252 of the cover 25. Thereby, the first seal portion 261 can be inhibited or prevented from moving in the circumferential direction. Further, the first seal portion 261 can be filled uniformly in the circumferential direction. This also makes it possible to inhibit or prevent moisture and dusts from entering the end 230 of the bearing holder 23 from below in the axial direction, thereby improving the water-proofing property and the dust-proofing property.

As illustrated in FIGS. 2A and 2B, the five protruding portions 252*b* are disposed at regular intervals in the circumferential direction when viewed in the axial direction. For example, as illustrated in FIG. 2B, the outer side face of the cylindrical portion 252 is circular about the central axis CA when viewed in the axial direction. The five protruding portions 252*b* are provided so as to equally divide the circumference of the outer side face of the cylindrical portion 252 into five. Thus, the cover 25 having the cylindrical portion 252 inserted into the end 230 of the bearing holder 23 is less likely to incline with respect to the axial direction. Therefore, the first seal portion 261 can be filled in the circumferential direction more uniformly. For example, the disc portion 251 can be prevented from inclining and protruding upward in the axial direction.

The number n of protruding portions 252*b* may be 2 or more other than 5, where n is a positive integer other than 1 and 5. In this case, when viewed in the axial direction, the n protruding portions 252*b* are provided so as to divide the circumference of the outer side face of the cylindrical portion 252. The protruding portions 252*b* are provided on the outer side face of the cylindrical portion 252 in this embodiment. However, the present disclosure is not limited to this, and the protruding portions 252*b* may be provided between the end 230 of the bearing holder 23 and the cylindrical portion 252, on the inner side face of the end 230 of the bearing holder 23. More specifically, the protruding portions 252*b* need to be provided on the inner side face of the end 230 of the bearing holder 23, and/or the outer side face of the cylindrical portion 252.

In this embodiment, the wall portion 253 extends in the circumferential direction, and is annular as illustrated in FIG. 2B and however, may be arcuate. Alternatively, a plurality of wall portions 253 may be arranged in the circumferential direction. This can increase the strength of the disc portion 251 to stabilize the cover 25 in shape.

In the case where the seal 26 (for example, a below-mentioned second seal portion 262) is provided between the disc portion 251 and the end 230 of the bearing holder 23 and/or housing 24, adhesiveness of the seal 26 to the end 230 of the bearing holder 23 and/or housing 24 can be improved by stabilizing the disc portion 251 in shape. Thus, the entry of moisture and dusts into the bearing holder 23 can be further inhibited or prevented.

Figure 3:
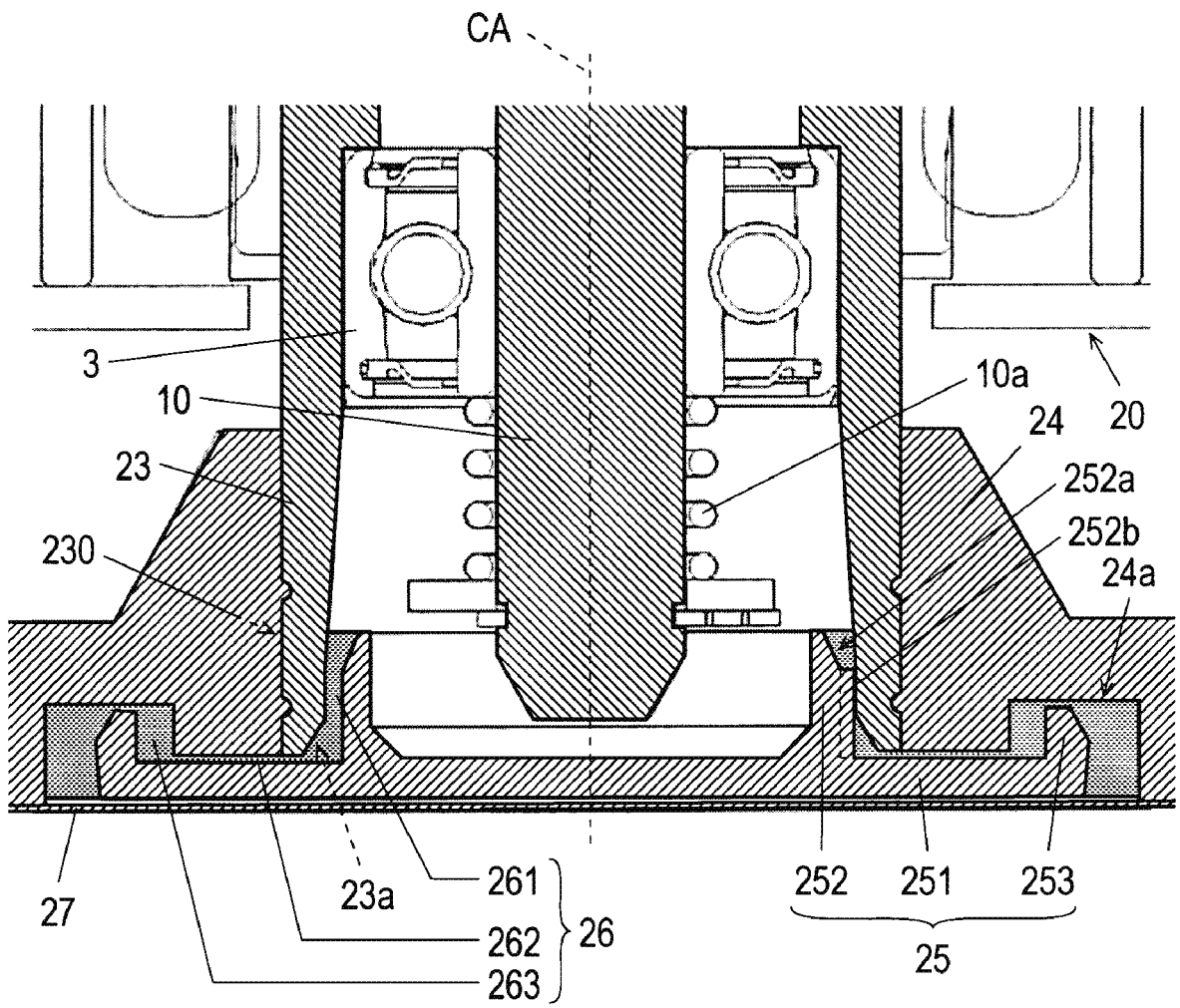
FIG. 3 is an enlarged sectional view illustrating an example of a main part in the vicinity of a seal of a fan motor in accordance with an embodiment.

The configuration of the seal 26 will be described below. FIG. 3 is an enlarged sectional view illustrating an example of a main part in the vicinity of the seal 26 of the fan motor 100 in accordance with the embodiment.

The seal 26 includes the first seal portion 261, the second seal portion 262, and a third seal portion 263. When a flowable material such as grease is used as the material for the seal 26, the seal 26 can be provided by applying the material for the seal 26 onto the at least one of sites for the first seal portion 261, the second seal portion 262, and the third seal portion 263. For example, the material for the seal 26 may be applied to the outer side face of the cylindrical portion 252 and/or the inner side face of the end 230 of the bearing holder 23. Alternatively, the material for the seal 26 may be applied to at least one of the upper face of the disc portion 251 on the outer side of the cylindrical portion 252 in the radial direction, a tip end below the end 230 of the bearing holder 23 in the axial direction, and a part of the lower face of the housing 24, which is covered with the disc portion 251. Alternatively, the material for the seal 26 may be applied to at least one of the surface of the wall portion 253, the inner side face and the bottom face of the groove portion 24*a* of the housing 24. Then, the cylindrical portion 252 is fit into the bearing holder 23, thereby the first seal portion 261, the second seal portion 262, and the third seal portion 263 are provided with the material for the seal 26 interposed between the cover 25 and the end 230 of the bearing holder 23 or the housing 24. In this manner, the seal 26 can be made of a flowable material.

In the radial direction, the first seal portion 261 is located between the inner side face of the end 230 of the bearing holder 23 and the outer side face of the cylindrical portion 252 of the cover 25. Thus, since the first seal portion 261 is located between the bearing holder 23 and the cover 25 at the end 230 of the bearing holder 23, moisture and dusts can be inhibited or prevented from entering the end 230 of the bearing holder 23 from below in the axial direction. Therefore, the water-proofing property and the dust-proofing property of the stator unit 2 can be improved.

In the axial direction, the second seal portion 262 is located between at least one of the end 230 of the bearing holder 23 and the housing 24, and the disc portion 251 of the cover 25. Thus, the second seal portion 262 can inhibit or prevent the entry of moisture and dusts into between the end 230 of the bearing holder 23 and the disc portion 251 of the cover 25, and/or between the housing 24 and the disc portion 251 of the cover 25 in the radial direction. Further, since the second seal portion 262 is provided between the end 230 of the bearing holder 23 and the disc portion 251 as well as between the housing 24 and the disc portion 251, by covering the end of an interface between the bearing holder 23 and the housing 24 on the lower side in the axial direction, with the second seal portion 262, the entry of moisture into the interface can be prevented. Therefore, the water-proofing property and the dust-proofing property of the stator unit 2 can be improved.

In the radial direction, the third seal portion 263 is located between the inner side face of the wall portion 253 and the outer side face of the groove portion 24a, and/or between the outer side face of the wall portion 253 and the inner side face of the groove portion 24a. Further, the third seal portion 263 may be located between the upper face of the wall portion 253 and the bottom face of the groove portion 24a in the axial direction. In this manner, the third seal portion 263 can inhibit or prevent the entry of moisture and dusts into between the groove portion 24a of the housing 24 and the wall portion 253 of the cover 25. Further, the third seal portion 263 is provided on the inner side and the outer side of the wall portion 253 in the radial direction. For example, when the seal 26 is made of a flowable material, the seal 26 stays between the inner side face of the wall portion 253 and the outer side face of the groove portion 24a, as well as between the outer side face of the wall portion 253 and the inner side face of the groove portion 24a to form the third seal portion 263. Furthermore, the third seal portion 263 does not run over from the lower face of the housing 24 downward in the axial direction.

The configuration of the bearing holder 23 will be described with reference to FIG. 3. The inner side face of the end 230 of the bearing holder 23 on the lower side in the axial direction is a smoot tapered face, and expands outward in the radial direction while extending downward in the axial direction. In other words, the inner side face expands in the form of a truncated cone with its center positioned on the central axis CA. This makes it easier to form the seal 26 (for example, the first seal portion 261) between the end 230 of the bearing holder 23 and the cylindrical portion 252 of the cover 25 in the axial direction while spreading the seal 26 uniformly in the circumferential direction. At this time, since the seal 26 expands in the circumferential direction without any gap, the entry of moisture into the interface between the bearing holder 23 and the housing 24 can be prevented. In addition, the inner side face of the end 230 expands outward in the radial direction while extending downward in the axial direction. For this reason, by fitting a tip end of the cylindrical portion 252 into the inner side face of the end 230, the first seal portion 261 can be provided between the end 230 of the bearing holder 23 and the cylindrical portion 252 of the cover 25 below the above fit structure in the axial direction.

The bearing holder 23 has a second inclined face 23a at the end 230 of the bearing holder 23. The second inclined face 23a is a face formed in such a way that a radial inner end portion of a tip end of the bearing holder 23 on the lower side in the axial direction is chamfered outward in the radial direction. The second inclined face 23a is provided at the axial lower edge of the end 230 of the bearing holder 23 on the inner side in the radial direction, and is annularly provided in the circumferential direction about the central axis CA. Thus, the cylindrical portion 252 of the cover 25 can be easily inserted into the end 230 of the bearing holder 23 via the seal 26 (for example, the first seal portion 261). In addition, the first seal portion 261 is also provided in the chamfered portion between the end 230 of the bearing holder 23 and the cylindrical portion 252. This makes the first seal portion 261 less likely to run over from between the end 230 of the bearing holder 23 and the cylindrical portion 252 upward in the axial direction. This structure can inhibit or prevent a trouble that the first seal portion 261 hits against or is adhered to the shaft 10, the bearing 3, and so forth.

Figure 4:
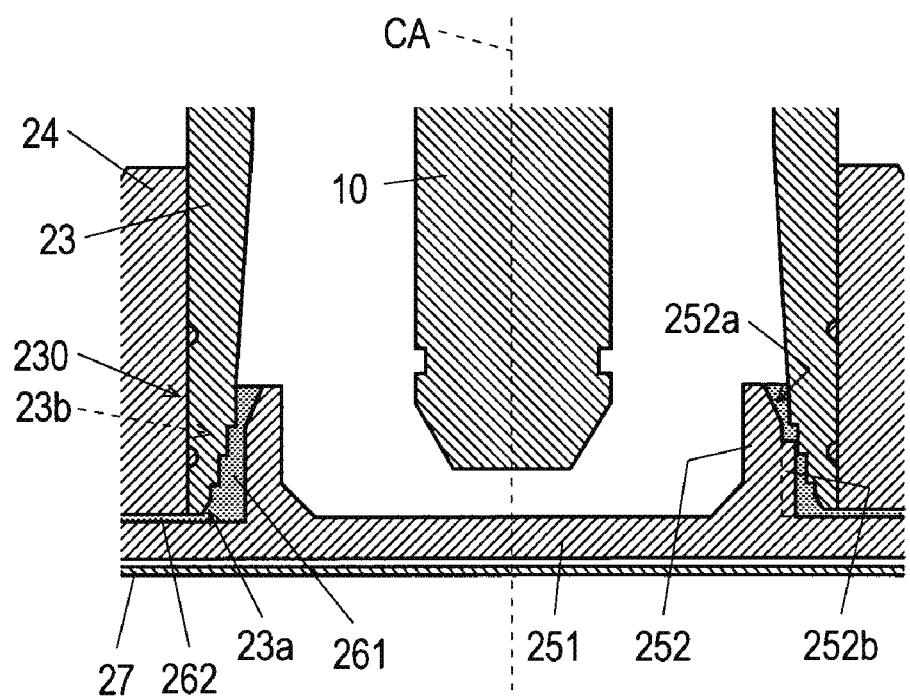
FIG. 4 is an enlarged sectional view illustrating an example of a main part in the vicinity of a seal of a fan motor in accordance with a modification example of the embodiment.

The inner side face of the end 230 of the bearing holder 23 is a smooth tapered face in this embodiment. However, the inner side face is not limited to this, and may be a face having irregularities. FIG. 4 is an enlarged sectional view illustrating another example of the main part in the vicinity of the seal 26 in a fan motor 100 in accordance with a modification example of the embodiment. In FIG. 4, to facilitate understanding of the structure, for example, some constituents such as the pre-load spring 10a are omitted.

As illustrated in FIG. 4, the inner side face of the end 230 of the bearing holder 23 has a stepped portion that expands outward in the radial direction while extending downward in the axial direction. The stepped portion includes a plurality of steps 23b, and has a plurality of side faces with different inner diameters when viewed in the axial direction. The side faces each are circular when viewed in the axial direction. In the plurality of side faces when viewed in the axial direction, the side face located on the lower side in the axial direction has a larger inner diameter than the side face located on the upper side in the axial direction.

The present disclosure is not limited to the example illustrated in FIG. 4, and the outer side face of the cylindrical portion 252 of the cover 25 may have the above-mentioned stepped portion. More specifically, at least one of the inner side face of the end 230 of the bearing holder 23 and the outer side face of the cylindrical portion 252 of the cover 25 may have the above-mentioned stepped portion having the plurality of side faces with different inner diameters when viewed in the axial direction.

When the inner side face of the end 230 and/or the outer side face of the cylindrical portion 252 is stepped in this manner, the first seal portion 261 can be easily provided between the end 230 of the bearing holder 23 and the cylindrical portion 252 of the cover 25 in the axial direction. In this stepped shape, as compared to the tapered shape, the inner diameters of the stepped inner side face of the end 230 and the stepped outer side face of the cylindrical portion 252 when viewed in the axial direction can be managed more easily.

For example, the fan motor 100 is the outer rotor-type motor in the above-mentioned embodiment and the modification example (See FIG. 1). However, the fan motor 100 is not limited to this, and may be an inner rotor-type motor.

For example, the present disclosure is useful for a motor in which a cover covers an end of a bearing holder of a stator unit.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a bearing that supports a shaft such that the shaft can rotate about a central axis which extends in an axial direction;
   a cylindrical bearing holder that extends in the axial direction;
   a cover that covers an end of the bearing holder on a first side of the motor in the axial direction; and
   a seal provided between the bearing holder and the cover and separated from the bearing in the axial direction, wherein the cover includes:
  a disc portion that is provided on the end on the first side in the axial direction, and extends in a radial direction; and
  a cylindrical portion that extends from the disc portion to a second side of the motor in the axial direction, and is located inside of the end, and
the seal includes a first seal portion located between an inner side face of the end and an outer side face of the cylindrical portion in the radial direction.

2. The motor according to claim 1, wherein at least one of the inner side face of the end and the outer side face of the cylindrical portion is provided with a protruding portion that protrudes in the radial direction.

3. The motor according to claim 2, wherein a length of the protruding portion in the axial direction is longer than a length of the protruding portion in the radial direction.

4. The motor according to claim 2, wherein a plurality of the protruding portions are arranged at regular intervals in a circumferential direction.

5. The motor according to claim 1, wherein a tip end of the cylindrical portion on the second side in the axial direction includes a first inclined surface chamfered inward in the radial direction.

6. The motor according to claim 1, wherein a tip end of the bearing holder on the first side in the axial direction includes a second inclined surface chamfered outward in the radial direction.

7. The motor according to claim 1, further comprising a housing that holds an outer circumferential face of the bearing holder on the first side in the axial direction, wherein
  the seal further includes a second seal portion, and
  the second seal portion is located between at least one of the end of the bearing holder and the housing and the disc portion of the cover in the axial direction.

8. The motor according to claim 1, wherein
  the cover further includes at least one wall portion that is provided outside of the cylindrical portion in the radial direction, and extends from the disc portion to the second side in the axial direction, and
  one wall portion extends in the circumferential direction, or two or more wall portions are arranged in the circumferential direction.

9. The motor according to claim 8, wherein
an end surface of the housing on the first side in the axial direction is provided with a groove portion that extends in the circumferential direction and is dented to the second side in the axial direction,
the groove portion accommodates at least a portion of the wall portion, and
the seal further includes a third seal portion is located in at least one of a space between an inner side surface of the wall portion and an outer side surface of the groove portion and a space between an outer side surface of the wall portion and an inner side surface of the groove portion in the radial direction.

10. The motor according to claim 1, wherein the inner side surface of the end of the bearing holder expands outward in the radial direction as the inner side surface extends toward the first side in the axial direction.

11. The motor according to claim 10, wherein
at least one of the inner side surface of the end of the bearing holder and the outer side surface of the cylindrical portion of the cover includes a stepped portion including a plurality of side surfaces with different inner diameters when viewed in the axial direction, and
in the plurality of side surfaces when viewed in the axial direction, the side surface located on the first side in the axial direction has a larger inner diameter than the side surface located on the second side in the axial direction.

12. A motor comprising:
a shaft that extends in an axial direction;
a bearing that supports the shaft such that the shaft is rotatable about a central axis;
a rotor that is rotatable along with the shaft;
a stator that drives the rotor;
a cylindrical bearing holder that extends in the axial direction;
a cover that covers an end of the bearing holder on a first side of the motor in the axial direction;
a seal provided between the bearing holder and the cover and seperated from the bearing in the axial direction; and
an additional bearing that is disposed in the stator, and rotatably supports the rotor, wherein
the cover includes;
  a disc portion that is provided on the end on the first side in the axial direction, and extends in a radial direction; and
  a cylindrical portion that extends from the disc portion to a second side of the motor in the axial direction and is located inside of the end, and
  the seal includes a first seal portion located between an inner side face of the end and an outer side face of the cylindrical portion in the radial direction; and the rotor includes a magnet outside of the stator in the radial direction.

13. The motor according to claim 12, further comprising:
an elastic member that is provided on the shaft on the first side in the axial direction, and biases the shaft to the second side in the axial direction; wherein
the shaft that is connected to the rotor via the bearing with the center of the shaft positioned on the central axis.

14. A fan motor comprising:
an impeller including a plurality of blades rotatable about a central axis; and
the motor according to claim 13, the motor rotating the impeller.

* * * * *